(12) United States Patent
Kabuto (10) Patent No.: US 10,477,140 B2
(45) Date of Patent: Nov. 12, 2019

(54) VIDEO SOURCE DEVICE, DISPLAY DEVICE, AND VIDEO DISPLAY SYSTEM

(71) Applicant: MAXELL, LTD., Kyoto (JP)

(72) Inventor: Nobuaki Kabuto, Tokyo (JP)

(73) Assignee: Maxell, Ltd., Kyoto (JP)

(*) Notice: Subject to any disclaimer, the term of this patent is extended or adjusted under 35 U.S.C. 154(b) by 0 days.

(21) Appl. No.: 16/253,602

(22) Filed: Jan. 22, 2019

(65) Prior Publication Data

US 2019/0158781 A1 May 23, 2019

Related U.S. Application Data

(63) Continuation of application No. 15/311,656, filed as application No. PCT/JP2014/071150 on Nov. 16, 2016, now Pat. No. 10,237,516.

(51) Int. Cl.
| | |
|---|---|
| *H04N 7/01* | (2006.01) |
| *G09G 3/36* | (2006.01) |
| *G09G 5/00* | (2006.01) |
| *G09G 5/12* | (2006.01) |
| *H04N 5/21* | (2006.01) |

(Continued)

(52) U.S. Cl.
CPC ......... *H04N 7/0132* (2013.01); *G09G 3/3611* (2013.01); *G09G 5/003* (2013.01); *G09G 5/12* (2013.01); *H04N 5/21* (2013.01); *H04N 5/57* (2013.01); *H04N 7/08* (2013.01); *G09G 5/18* (2013.01); *G09G 5/363* (2013.01); *G09G 2320/0247* (2013.01); *G09G 2320/0626* (2013.01); *G09G 2330/021* (2013.01); *G09G 2340/0435* (2013.01); *G09G 2340/10* (2013.01); *G09G 2340/16* (2013.01); *G09G 2350/00* (2013.01); *G09G 2360/18* (2013.01); *G09G 2370/04* (2013.01); *H04N 5/205* (2013.01); *H05K 999/99* (2013.01)

(58) Field of Classification Search
None
See application file for complete search history.

(56) References Cited

U.S. PATENT DOCUMENTS

2014/0092113 A1 4/2014 Petersen et al.

FOREIGN PATENT DOCUMENTS

| JP | 11-231854 A | 8/1999 |
|---|---|---|
| JP | 2010-283432 A | 12/2010 |

(Continued)

OTHER PUBLICATIONS

International Search Report of PCT/JP2014/071150 dated Nov. 11, 2014.

*Primary Examiner* — Kenneth B Lee, Jr.
(74) *Attorney, Agent, or Firm* — Mattingly & Malur, PC (57) ABSTRACT

A video display with high image quality is achieved even when a frame cycle varies for each frame. A video display system includes a video source device 11 which outputs a video signal and a display device 12 which displays a video based on a video signal output from the video source device 11. The video source device 11 includes a drawing time prediction unit 104 and a transmitting unit 102. The drawing time prediction unit 104 calculates frame interval information indicating an interval from when a video signal of a first frame is output to when a video signal of a second frame to be a next frame of the first frame is output. The transmitting unit 102 transmits the frame interval information calculated by the drawing time prediction unit 104 to the display device 12.

4 Claims, 6 Drawing Sheets

(51) Int. Cl.
  *H04N 5/57* (2006.01)
  *H04N 7/08* (2006.01)
  G09G 5/18 (2006.01)
  G09G 5/36 (2006.01)
  H04N 5/205 (2006.01)

(56) References Cited

FOREIGN PATENT DOCUMENTS

| | | |
|---|---|---|
| JP | 2011-004155 A | 1/2011 |
| WO | 2013/027705 A1 | 2/2013 |

VIDEO SOURCE DEVICE, DISPLAY DEVICE, AND VIDEO DISPLAY SYSTEM

TECHNICAL FIELD

The present invention relates to a video source device, a display device and a video display system, and particularly relates to an effective technique for reducing the deterioration in image quality due to the fluctuation of the video display state at the time of refresh rate change.

BACKGROUND ART

In a display used for a personal computer and others, the rewriting of the screen, that is, the so-called refresh is performed about several tens of times per second so as to prevent the flicker of the screen.

As the frequency of this refresh, that is, the so-called refresh rate becomes higher, the flicker is reduced more. The refresh rate is set to, for example, a constant value of about 50 Hz to about 70 Hz.

The performance of the display has a close relation with the performance of the image processor mounted on the personal computer, that is, the GPU (Graphics Processing Unit) and others. For example, since the drawing speed is slow in the case of a GPU with a slow operating speed, there is a fear that the next frame is not drawn within the refresh period and the same frame is displayed. Thus, there is a problem that the display performance of the display is lowered.

As the techniques for solving this problem, there are those that vary the refresh rate (for example, see Patent Document 1 and Patent Document 2). Patent Document 1 describes that, based on the drawing processing time of an image being output by a video source device and the output time of one screen calculated from a refresh rate value, the refresh rate value is modified.

In addition, Patent Document 2 describes a refresh rate variation technique in which, when a video source device draws one frame, the video source device outputs a video signal and the display panel displays the one frame, and if the drawing time exceeds a predetermined time and the display signal is not output, the display panel displays a previous frame.

RELATED ART DOCUMENTS

Patent Documents

Patent Document 1: Japanese Patent Application Laid-Open Publication No. H11-231854
Patent Document 2: U.S. Unexamined Patent Application Publication No. 2014/0092113

SUMMARY OF THE INVENTION

Problems to be Solved by the Invention

However, the technique in Patent Document 1 described above performs the downward revision when the drawing processing time exceeds the output time of one screen, and performs the upward revision when the output time of one screen is equal to or longer the drawing processing time, and the deterioration in image quality due to the fluctuation of the video display state at the time of the refresh rate change is not taken into consideration.

In addition, in the case of Patent Document 2, the refresh rate is varied depending on the drawing time of each frame, but the influence on the image quality of the display panel due to the frame cycle varied for each frame is not taken into consideration.

An object of the present invention is to provide a technique capable of achieving a video display with high image quality even when the frame cycle varies for each frame.

The above and other objects and novel characteristics of the present invention will be apparent from the description of the present specification and the accompanying drawings.

Means for Solving the Problems

The following is a brief description of an outline of the typical invention disclosed in the present application.

That is, a typical video display system includes a video source device which outputs a video signal, and a display device which displays a video based on the video signal output from the video source device.

A video display system includes a frame interval information processing unit and a transmitting unit. The frame interval information processing unit calculates frame interval information indicating an interval from when a video signal of a first frame is output to when a video signal of a second frame to be a next frame of the first frame is output. The transmitting unit transmits the video signal and the frame interval information calculated by the frame interval information processing unit to the display device. In particular, the transmitting unit transmits the frame interval information after imparting it to the video signal of the first frame.

Furthermore, the display device includes a display unit, a control unit and a temporary storage unit. The display unit displays a video signal. The control unit performs the control to display the video signal on the display unit based on the frame interval information transmitted from the video source device. The temporary storage unit temporarily stores the video signal transmitted from the video source device.

In addition, when a transmission interval from the first frame to the second frame is two or more times as long as a shortest display scanning frame interval of the display device, the control unit divides the video signal of the first frame stored in the temporary storage unit into two display scanning periods for the display on the display unit.

Effects of the Invention

The effects obtained by typical embodiments of the invention disclosed in the present application will be briefly described below.

A video with high image quality can be displayed even with a video signal whose frame cycle varies for each frame.

DETAILED DESCRIPTION OF PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle.

Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Also, components having the same function are denoted by the same reference characters throughout the drawings for describing the embodiments, and the repetitive description thereof is omitted.

In the following, exemplary embodiments will be described in detail.

First Embodiment

<Configuration Example of Video Display System>

Figure 1:
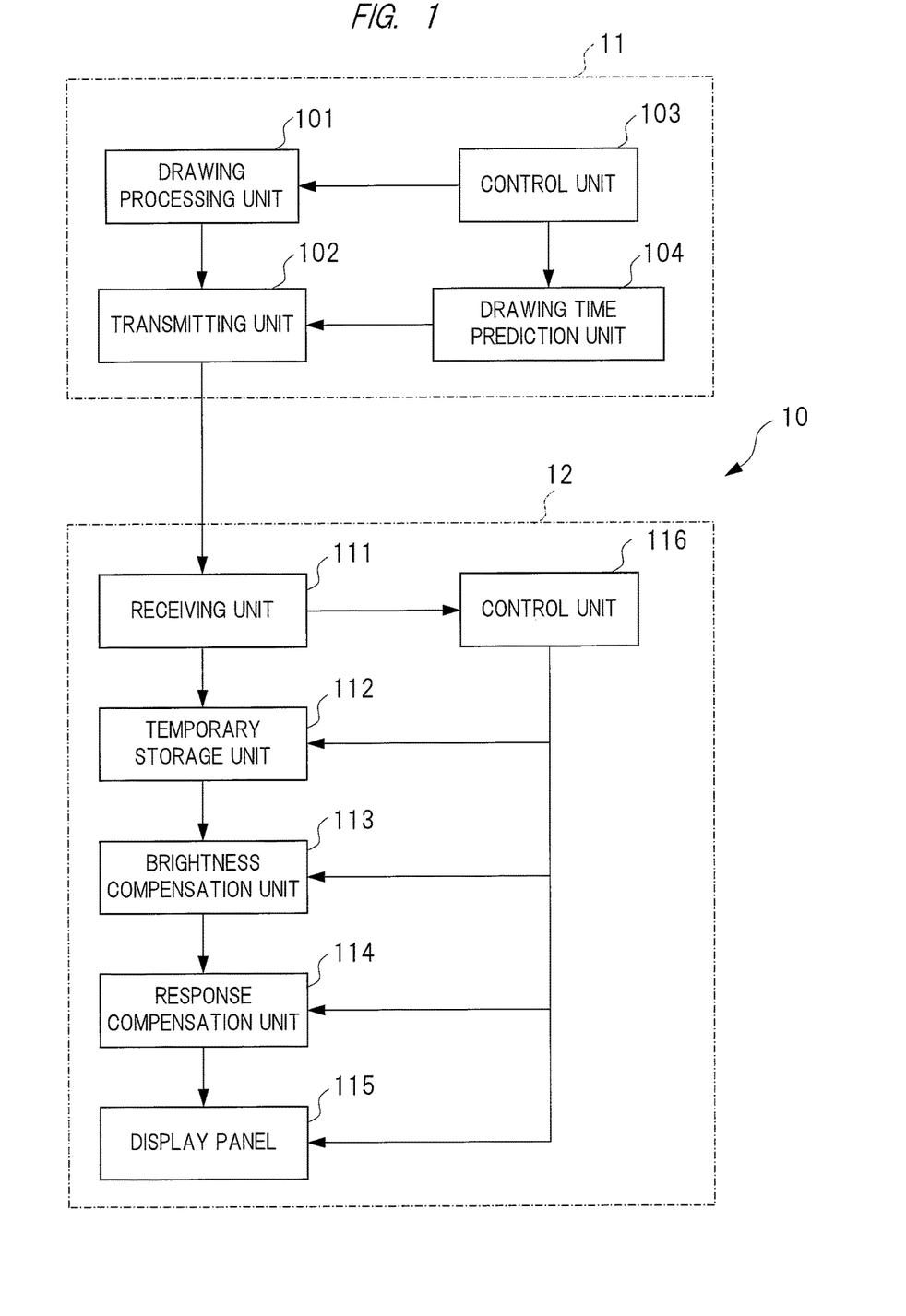
FIG. 1 is an explanatory diagram illustrating an example of a configuration in a video display system according to a first embodiment.

FIG. 1 is an explanatory diagram illustrating an example of a configuration in a video display system 10 according to the first embodiment.

The video display system 10 includes a video source device 11 and a display device 12 as illustrated in FIG. 1. The video source device 11 and the display device 12 are connected with each other through a video interface. The video interface is, for example, an interface in conformity with connection standards such as HDMI (High Definition Multimedia Interface, registered trademark).

The video source device 11 and the display device 12 exchange control information through the video interface, determine the format of the video signal in the range where the display device 12 is adaptable, and transmit and receive metadata of the video signal.

The video display system 10 is a system in which a video is displayed by transmitting the video signal output by the video source device 11 to the display device 12, and is, for example, a personal computer, a game machine and others. When the video display system 10 is a personal computer, the video source device 11 corresponds to a main body of the personal computer, and the display device 12 corresponds to a monitor such as a liquid crystal display.

The video source device 11 includes a drawing processing unit 101, a transmitting unit 102, a control unit 103 and a drawing time prediction unit 104. The drawing processing unit 101 is composed of, for example, a GPU which is an image processor, and performs the drawing processing in each frame based on the control of the control unit 103.

The drawing time prediction unit 104 which is a frame interval information processing unit predicts the drawing time required for drawing the next frame based on the drawing contents. Then, the drawing time prediction unit 104 calculates the frame interval until the next frame is output as the video signal, that is, the time until the next video signal is output from the result of the prediction.

The transmitting unit 102 transmits the video signal of the frame drawn by the drawing processing unit 101 and the frame interval information including the frame interval calculated by the drawing time prediction unit 104 to the display device 12 through an interface such as the HDMI.

The control unit 103 is composed of, for example, a CPU, and controls the drawing processing in the drawing processing unit 101 based on the applications stored in a main memory (not shown) and others. In addition, the control unit 103 performs the operation control in the drawing time prediction unit 104.

The display device 12 includes a receiving unit 111, a temporary storage unit 112, a brightness compensation unit 113, a response compensation unit 114, a display panel 115 and a control unit 116. In this display device 12, the receiving unit 111 receives the video signal and the frame interval information transmitted from the video source device 11 through the interface.

The temporary storage unit 112 is a so-called frame memory, and temporarily stores the video signal received by the receiving unit 111. The temporary storage unit 112 is composed of, for example, a volatile memory such as a RAM (Random Access Memory).

The brightness compensation unit 113 performs the compensation processing of the brightness in the video signal. In the brightness compensation processing, the brightness of the video to be displayed on the display panel 115 is adjusted based on, for example, a frame cycle. The response compensation unit 114 generates a signal for the overdrive for improving the optical response of the display panel 115.

The display panel 115 is a display unit such as a liquid crystal display or a plasma display, and includes a display drive circuit, a backlight and others. The control unit 116 controls the operation of the temporary storage unit 112, the brightness compensation unit 113, the response compensation unit 114 and others based on the frame interval information.

The video signal received by the receiving unit 111 is temporarily stored in the temporary storage unit 112 and is then transmitted to the display panel 115 via the brightness compensation unit 113 and the response compensation unit 114, so that the video is displayed. In addition, the frame interval information received by the receiving unit 111 is output to the control unit 116.

The control unit 116 controls the temporary storage unit 112, the brightness compensation unit 113, the response compensation unit 114 and the display panel 115 based on the received frame interval information to perform the correction in preparation for the frame interval variation. This maintains the high image quality display.

<Operation Example of Video Display System>

Figure 2:
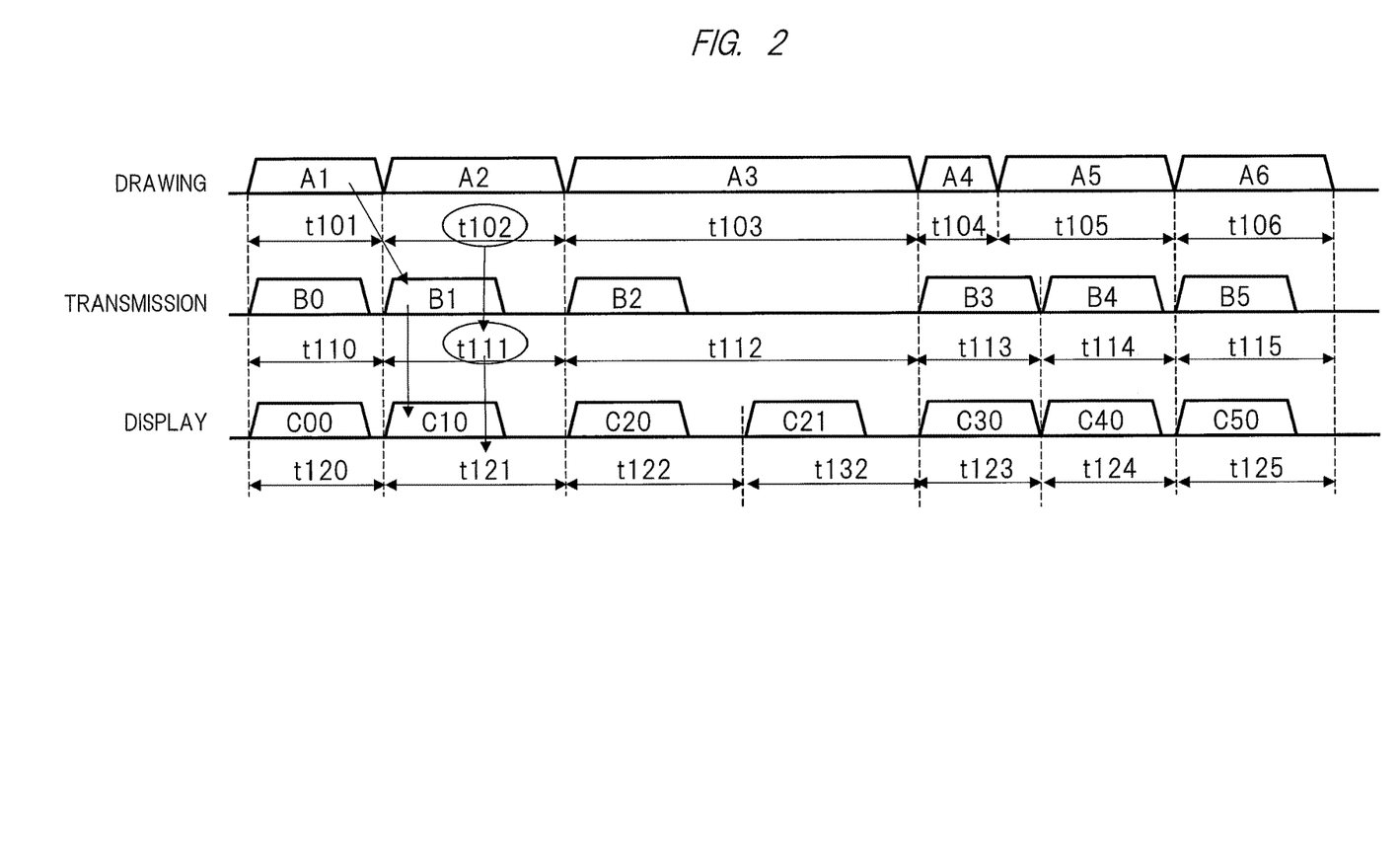
FIG. 2 is an explanatory diagram illustrating an example of the timings of the drawing, the transmission and the display in the video display system in FIG. 1.

FIG. 2 is an explanatory diagram illustrating an example of the timings of the drawing, the transmission and the display in the video display system 10 in FIG. 1. In FIG. 2, the timings of the drawing, the transmission and the display scanning are shown from the top to the bottom, respectively.

In FIG. 2, the "DRAWING" represents the drawing period by the drawing processing unit 101. The "TRANSMISSION" represents the output period of the video signal and the frame interval information to be transmitted from the video source device 11 to the display device 12. The "DISPLAY" represents the display scanning period by the display panel 115.

Specifically, the Ai shown in the "DRAWING" indicates the drawing period of the i-th frame, and the Bj shown in the "TRANSMISSION" indicates the transmission period of the j-th frame. In addition, the Ck0 and the Ck1 shown in the "DISPLAY" indicate the display scanning periods of the k-th frame, the t10$i$ indicates the drawing time of the i-th frame, and the t11$j$ indicates the transmission frame interval between the j-th frame and the j+1-th frame (also referred to as a transmission frame cycle of the j-th frame). The t12$k$ and the t13$k$ respectively indicate the frame intervals of the display scanning periods of the Ck0 and the Ck1. Herein, each of i, j and k is an integer.

Figure 3:
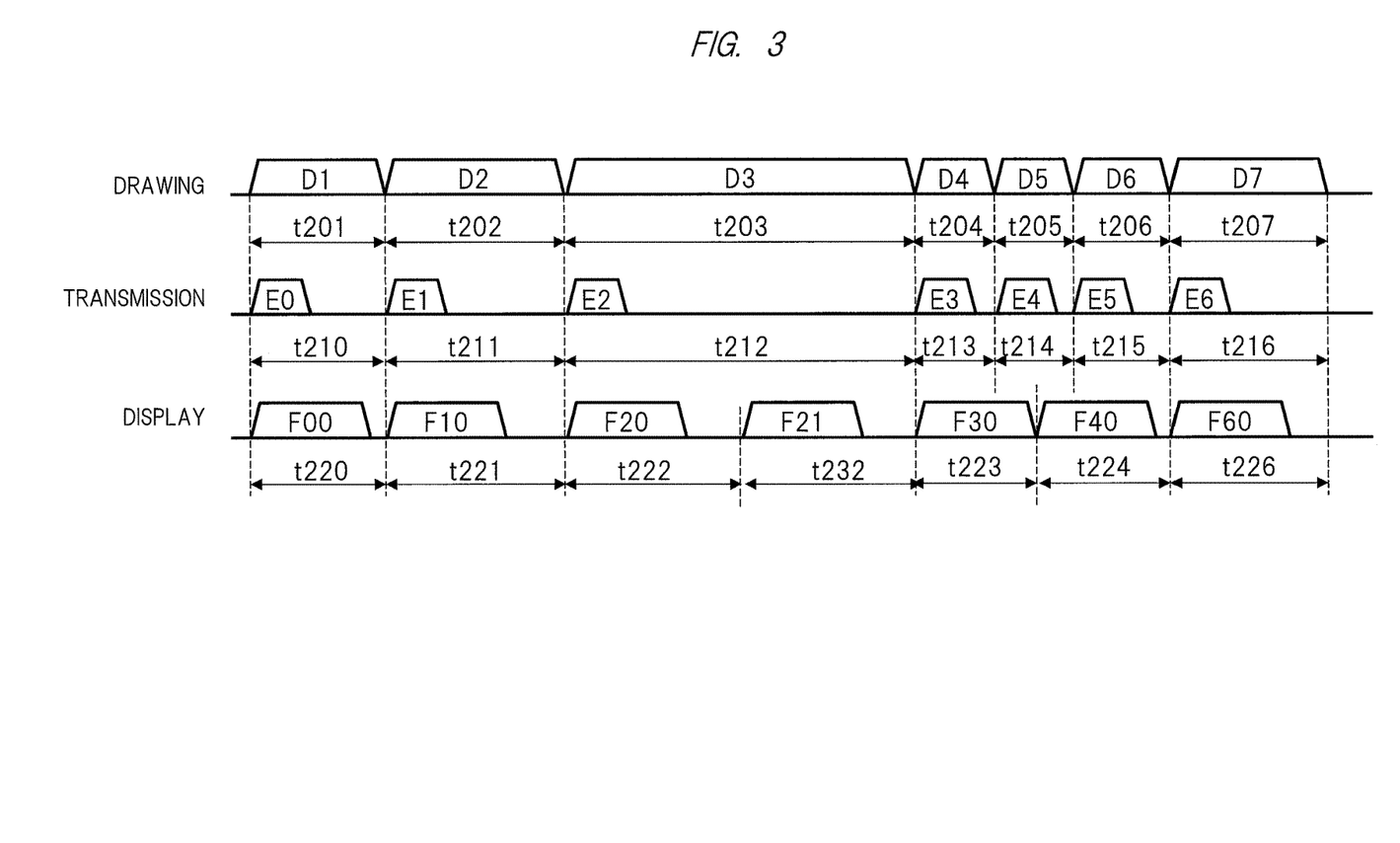
FIG. 3 is an explanatory diagram illustrating an example of the timings of the drawing, the transmission and the display in a video display system according to a second embodiment.
Figure 4:
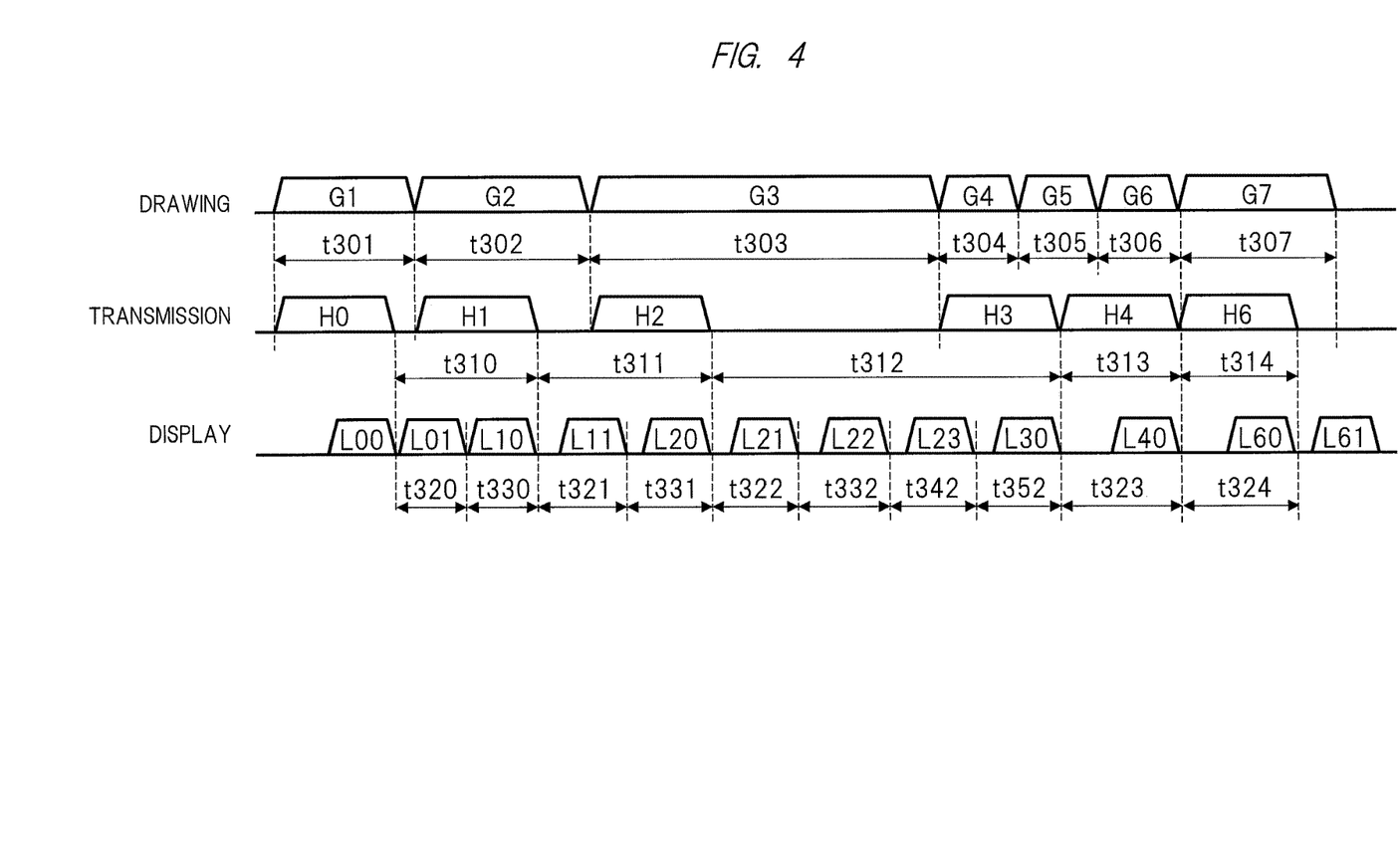
FIG. 4 is an explanatory diagram illustrating an example of the timings of the drawing, the transmission and the display in a video display system according to a third embodiment.
Figure 6:
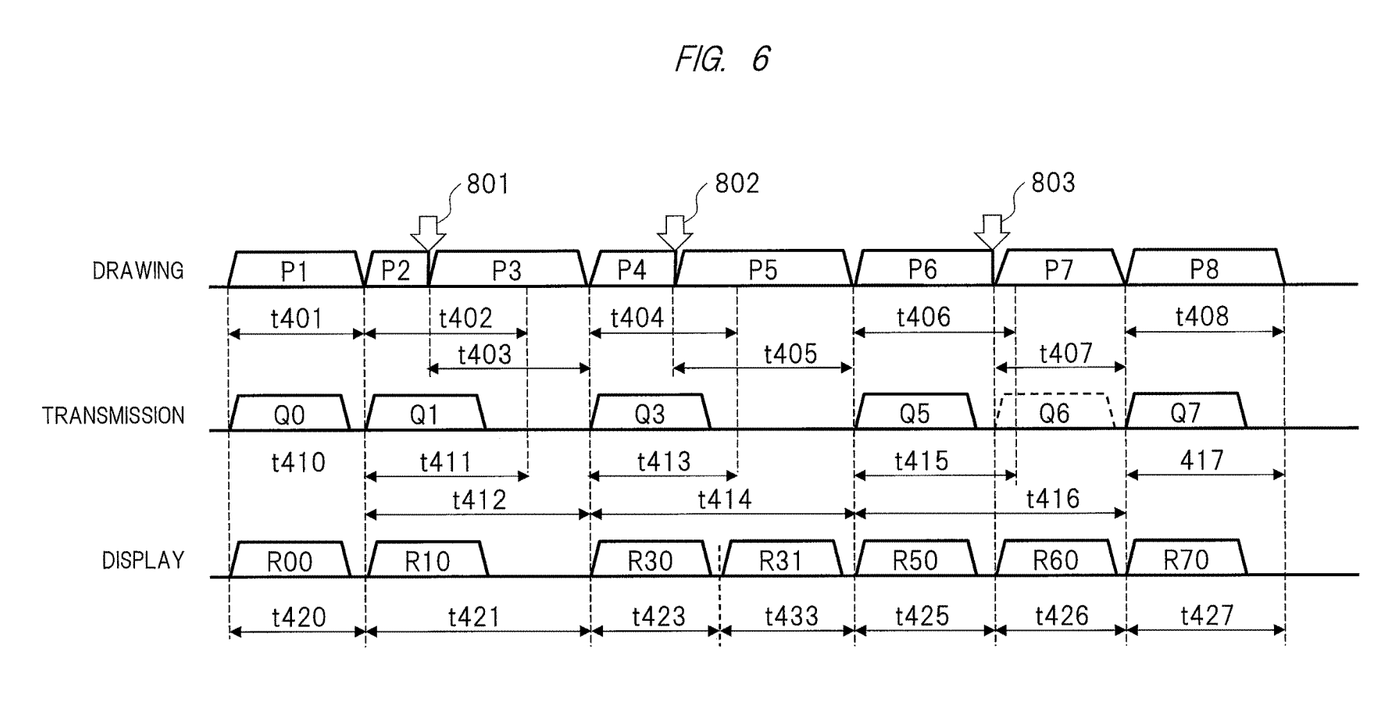
FIG. 6 is an explanatory diagram illustrating an example of the timings of the drawing, the transmission and the display in the video display system in FIG. 5.

Furthermore, although FIG. 2 shows the case in which the start positions of the drawing period Ai+1 of the i+1-th frame, the transmission period Bi of the i-th frame and the display scanning period Ci0 of the i-th frame are made to coincide with each other for simplification of explanation, it is clear that there is no influence at all even if predetermined delays occur in the transmission period Bi and the display scanning period Ci0 due to the signal processing and the like as compared with the illustrated case. The same goes for FIGS. 3, 4 and 6 shown below.

First, the first frame drawn in the drawing period A1 by the drawing processing unit 101 of the video source device 11 is output from the transmitting unit 102 to the receiving unit 111 of the display device 12 in the first frame transmission period B1 during the drawing period A2 in which the drawing processing unit 101 draws the second frame.

At this time, the drawing time prediction unit 104 predicts the time t102 required for the drawing based on the drawing contents of the second frame, and calculates the transmission frame interval t111 equal to the predicted time t102. The transmitting unit 102 outputs the transmission frame interval t111 to the receiving unit 111. Namely, in the video signal transmission period B1 of the first frame, the information of the transmission frame interval t111 between the first frame and the second frame corresponding to the drawing predicted time t102 of the second frame is transmitted from the transmitting unit 102 to the receiving unit 111. Thereafter, the drawing, the drawing time prediction and the transmission of the second and subsequent frames are performed in the same manner.

In the video transmission between the transmitting unit 102 and the receiving unit 111, the shortest time for transmitting one frame is determined from restrictions such as the transmission speed. For example, in the case of the fourth frame drawing period A4 where the drawing time is shorter than the shortest transmission time, the transmission is started after the end of the transmission period B3 of the third frame.

Although the drawing of the fifth frame is started without waiting for the start of the transmission of the fourth frame in FIG. 2, the drawing of the fifth frame may be started after the end of the transmission of the third frame when the start of the drawing of the fifth frame is difficult due to the restrictions of the frame memory and the like.

For example, when the frame drawing predicted time t104 is shorter than the shortest frame transmission time as described above, the drawing predicted time t104 may also be transmitted to the display device 12 in addition to the transmission of the transmission frame interval t113.

For example, when the more delay occurs in the display scanning timing than in the transmission timing due to circumstances such as those described below, the usage to shorten the delay by the difference between the transmission frame interval t113 and the drawing predicted time t104 is possible. As a result, the delay time from the drawing to the display can be shortened, and a display with a good response can be achieved.

The display device 12 causes the display panel 115 to display the video signal received by the receiving unit 111. FIG. 2 shows a case where the transmission period and the display scanning period are approximately equal to each other. The display panel 115 usually has a predetermined synchronous relation between the display scanning period and the display timing.

For example, when the display panel 115 is a CRT (Cathode Ray Tube), the display panel 115 emits light almost simultaneously with the display scanning. In addition, when the display panel 115 is an LCD, the transmittance and the reflectance begin to change from the display scanning time. Then, when the backlight of the LCD is a continuous-on backlight, these changes immediately lead to the display.

Furthermore, when the backlight is a pulsed light emitting backlight, the display panel 115 emits light at a predetermined timing after the display scanning. Although depending on the type of display panel, in general, the flicker can be reduced and the video quality can be improved as the refresh rate is higher, that is, as the frame interval is shorter.

<Reduction of Flicker>

Thus, for example, when the drawing period A3 of the third frame is long and the interval t112 between the second frame transmission period B2 and the third frame transmission period B3 is two or more times as long as the shortest display scanning frame interval of the display panel 115, the control unit 116 provides two scanning periods of a display scanning period C20 and a display scanning period C21 by using the video signal of the second frame stored in the temporary storage unit 112.

Namely, it is preferable that the display scanning period is repeated the number of times of the quotient (round down decimal places) obtained by dividing the frame transmission interval by the shortest display scanning frame interval. In this case, the flicker is less likely to occur by arranging each display scanning period at equal intervals in the frame transmission period.

The temporary storage unit 112 is controlled by the control unit 116, and is used for temporarily storing the video signal so that the video signal is repeatedly used in a plurality of display scanning periods.

In addition to the shortest time of the display scanning frame interval, the longest time is also provided in the display panel 115 in some cases. If the longest time is two or more times as long as the shortest time, the above-described method can always be applied.

However, otherwise, the above-described display scanning frame interval of the equal arrangement exceeds the longest time determined by the display panel in some cases. In that case, after the display scanning frame interval is set to the shortest time, the number of repetitions is increased by one.

As a result, since the cumulative value of the repeated display scanning periods exceeds the corresponding frame transmission time, the display scanning of the next frame is started immediately after the end of the display scanning period, and the excess time may be adjusted within the transmission time of the next frame.

As a result of the display scanning processing described above, the display scanning frame interval t12$k$ and the display scanning frame interval t132 in the display scanning timing Ck0 and the display scanning timing C21 in FIG. 2 vary within the range from the shortest time to the longest time determined in the display panel 115.

<Display Correction Due to Variation of Display Scanning Frame Interval>

Subsequently, since the influence on the brightness and the image quality of the optical response and the influence on the reliability of the display panel 115 may occur due to the variation of the display scanning frame interval, the countermeasure methods against them will be described.

When the display panel 115 is, for example, an LCD and includes a light bulb with a constant-on backlight, the fluctuation in brightness due to the variation in the display scanning frame interval is small. However, in the case of a light bulb with a pulsed light emitting backlight, it is necessary to suppress the brightness fluctuation and prevent the flicker phenomenon by making the average brightness constant in units of the display scanning frame interval.

Namely, it is possible to prevent the fluctuation in brightness by controlling the light emitting time, the number of light emission pulses and the light emitting brightness by the display scanning frame interval so as to make ((light emitting time)/(display scanning frame interval))×(light emitting brightness) or ((the number of light emitting pulses)/(display scanning frame interval))×(pulse light emitting brightness) constant.

In addition, when the display panel 115 is a pulse-width modulation panel such as an OLED (Organic Electro-Luminescence), the pulse width to be a reference is made to be proportional to the display scanning frame interval, or the drive voltage is adjusted so that the brightness is proportional to the display scanning frame interval.

When the display panel 115 is a pulse-number modulation panel such as a plasma display, the drive voltage may be adjusted so that the brightness is proportional to the display scanning frame interval, or the number of pulses may be made to be proportional to the display scanning frame interval. These processings are performed by the control unit 116 by controlling the display panel 115 including a display driving circuit (not shown) and a backlight.

In addition, when the brightness of the display panel 115 depends on the display scanning frame interval, the video signal to be supplied to the display panel 115 is corrected by the brightness compensation unit 113 so that the fluctuation is compensated in place of or in combination with the fluctuation prevention technique described above. The brightness compensation unit 113 may be configured of, for example, an LUT (Look Up Table), a multiplier and others.

When the brightness compensation like this is performed, for example, the display scanning frame interval t121 between the first frame and the second frame is required before the start of the display scanning period C10 of the first frame. The transmission frame interval information t111 that determines the display scanning frame interval t121 is preferably transmitted at the beginning of the transmission period B1 of the first frame or at the timing earlier than the beginning.

The response compensation unit 114 generates a signal for the overdrive for improving the optical response of the display panel 115 as described above. The overdrive is to enlarge and compensate a change from the previous frame when the change is large. Since the compensation tends to be insufficient when the display scanning frame interval is short and the compensation tends to be excessive when the display scanning frame interval is long, the overdrive functions to correct the shortfall or the excess.

Furthermore, in the case where the display panel 115 is AC-driven by reversing the polarity for each display scanning period like an LCD, the reliability and the display quality of the display panel are affected if the AC balance is disturbed and the DC component is increased, and it is thus necessary to keep the AC balance.

For this reason, it is preferable that the next display scanning frame period is driven with the negative polarity if the difference time obtained by subtracting the cumulative total of the display scanning frame intervals driven with the negative polarity from the cumulative total of the display scanning frame intervals driven with the positive polarity is positive, and the next display scanning frame period is driven with the positive polarity if the difference time is negative. The absolute value of the difference time is well-balanced when it is about half of the display scanning frame interval. From this point of view, the display scanning frame intervals adjacent to each other are preferably approximately equal to each other.

For this purpose, the display scanning frame period C10 may be delayed by half of the difference between the transmission frame intervals t111 and t110, that is, (t111−t110)/2 so that the display scanning frame intervals t120 and t121 in FIG. 2 become equal to each other.

Next, it is preferable that the display scanning frame intervals t121, t122 and t132 are equal to one another. In this case, the following relations are given.

$$t120=(t110+t111)/2$$

(however, since the display scanning period C10 cannot be placed before the transmission period B1, t120=t110 when t120<t110)

$$t121=(t110+t111+t112-t120)/3$$

$$t122=(t110+t111+t112+t113-t120-t121)/3$$

(however, since the display scanning period C30 cannot be placed before the transmission period B3, t122=t121 in the example of FIG. 2)

$$t132=t122$$

Here, since the display scanning period C30 and the transmission period B3 have the same timing, the display scanning frame interval t123 and later are determined by repeating the above calculation again.

As described above, the calculation results of the display scanning frame intervals differ depending on which of the reliability of the display panel 115 and the delay time taken from the drawing to the display is prioritized. Therefore, a priority order may be determined as the display system 12, or an intermediate value of the two calculation results may be used.

As described above, the video source device 11 predicts the transmission frame interval until the start of the transmission of the next frame, that is, the frame interval information based on the drawing predicted time and previously transmits it to the display device 12 together with the video signal. The display device 12 inserts the display scanning period in accordance with the transmission frame interval, thereby making it possible to control the overdrive for the optical brightness compensation while keeping the average brightness of each frame constant.

As a result, even when the refresh rate is changed, the fluctuation in the brightness of the video displayed on the display device 12 can be reduced, and the video display system 10 with the optimized optical response can be achieved.

Note that the information about the shortest time and the longest time of the display scanning frame interval is transmitted from the control unit 116 in the display device 12 to the control unit 103 in the video source device 11, so that the video source device 11 can select the drawing period and the transmission frame interval in accordance with the type of the display device 12.

Second Embodiment

<Operation Example of Video Display System>

In the present embodiment, the case where the transmission time is shorter than the drawing time and the display scanning time will be described. When a high-speed interface is used for the video interface, the transmission time can be shortened. When a video signal in a lower resolution than 4K2K, for example, the full HD in the resolution of about 1920 horizontal pixels×about 1080 vertical pixels is transmitted by using an interface capable of transmitting a video signal in 4K2K which is a video in a high resolution of about 4000 horizontal pixels×about 2000 vertical pixels, the transmission time of the video signal can be significantly shortened.

Note that the configuration in the video display system 10 is the same as that in FIG. 1 of the first embodiment, and thus the description thereof will be omitted.

FIG. 3 is an explanatory diagram illustrating an example of the timings of the drawing, the transmission and the display in the video display system 10 according to the second embodiment.

In FIG. 3, the timings of the drawing, the transmission and the display scanning are respectively shown from the top to the bottom in the same manner as that in FIG. 2. In FIG. 3, the "DRAWING" represents the drawing period by the drawing processing unit 101. The "TRANSMISSION" represents the output period of the video signal and the frame interval information to be transmitted from the video source device 11 to the display device 12. The "DISPLAY" represents the display scanning period by the display panel 115.

Specifically, the Di shown in the "DRAWING" in FIG. 3 indicates the drawing period of the i-th frame, and the Ej shown in the "TRANSMISSION" indicates the transmission period of the j-th frame. The Fk0 and the Fk1 shown in the "DISPLAY" indicate the display scanning periods of the k-th frame. In addition, the t20$i$ indicates the drawing time of the i-th frame, and the t21$j$ indicates the transmission frame interval between the j-th frame and the j+1-th frame (also referred to as a transmission frame cycle of the j-th frame). The t22$k$ and the t23$k$ respectively indicate the frame intervals of the display scanning periods of the Fk0 and the Fk1. Herein, each of i, j and k is an integer.

In addition, the timings until the drawing period D4 of the fourth frame, the transmission period E3 of the third frame and the display scanning period F30 of the second frame are the same as those in FIG. 2 except that the transmission period is short, and thus the description thereof will be omitted.

First, since the transmission period E3 is short, the transmission period E4 begins immediately after the drawing period D4 ends. However, the display scanning period F30 continues even after the transmission frame interval t213.

Although the display scanning period F30 has a region that overlaps with the transmission period E4, the image position of the display scanning of the overlapping region is not transmitted yet. Therefore, the display scanning is performed by using the video signal of the third frame. When the display scanning period F30 of the third frame ends, the display scanning period F40 of the fourth frame is started.

Since the drawing period D5 and the transmission period E4 are also short, the transmission period E5 of the fifth frame ends earlier before the display scanning period F40 of the fourth frame ends. For this reason, the latter half of the display scanning period F40 can be used for displaying the video signal in the fifth frame.

However, when a video signal of a frame is switched to a video signal of a different frame within the same display scanning period, the switching portion becomes conspicuous in some cases. For example, when a vertical line moves to the right, a vertical line of the latter frame is divided to the right of a vertical line of the former frame. In order to prevent this phenomenon, it is preferable that the fourth frame and the fifth frame are mixed and gradually switched in the switching region.

The response compensation unit 114 for compensating the optical response takes the operation to emphasize the difference from the former frame. Thus, the adverse effect due to the excessive compensation can be reduced by weakening the emphasizing operation of the response compensation unit 114 in the region where the videos of the fourth frame and the fifth frame are mixed and switched.

As described above, a special circuit such as the response compensation unit used for the mixing operation of adjacent frame videos becomes unnecessary by adjusting and utilizing the control parameters of the response compensation unit 114, and an increase in circuit costs can be suppressed.

According to the above, when the transmission speed is fast and the transmission frame interval can be shortened, even if the display scanning cycle of the display panel is long, the change in the drawing data can be promptly reflected on the display, and the display response of the display device 12 can be improved.

Third Embodiment

In the present third embodiment, the operation of the video display system in the case where the display scanning time is shorter than the drawing time and the transmission time will be described with reference to FIGS. 1 and 4.

<Operation Example of Video Display System>

FIG. 4 is an explanatory diagram illustrating an example of the timings of the drawing, the transmission and the display in the video display system 10 according to the present third embodiment. FIG. 4 is a diagram for explaining the timings of the drawing, the transmission and the display in the same manner as those of FIG. 2 of the first embodiment and FIG. 3 of the second embodiment.

In FIG. 4, the timings of the drawing, the transmission and the display scanning are respectively shown from the top to the bottom in the same manner as those in FIGS. 2 and 3. In FIG. 4, the "DRAWING" represents the drawing period by the drawing processing unit 101. The "TRANSMISSION" represents the output period of the video signal and the frame interval information to be transmitted from the video source device 11 to the display device 12. The "DISPLAY" represents the display scanning period by the display panel 115.

Specifically, the Gi shown in the "DRAWING" in FIG. 4 indicates the drawing period of the i-th frame. The Hj shown in the "TRANSMISSION" in FIG. 4 indicates the transmission period of the j-th frame. The Lk0, the Lk1, the Lk2 and the Lk3 shown in the "DISPLAY" in FIG. 4 indicate the display scanning periods of the k-th frame. In addition, the t30$i$ indicates the drawing time of the i-th frame, the t31$j$ indicates the transmission frame interval between the j-th frame and the j+1-th frame (also referred to as a transmission frame cycle of the j-th frame), and the t32$k$, the t33$k$, the t34$k$ and the t35$k$ respectively indicate the frame intervals of the display scanning periods of the Lk0, the Lk1, the Lk2 and the Fk3. Herein, each of i, j and k is an integer.

In FIG. 2 of the second embodiment, the transmission frame interval t11$j$ and the frame intervals t12$k$ and t13$k$ of the display scanning periods are indicated based on the start time points of the transmission period Bkj and the display scanning periods Ck0 and Ck1. The difference between FIG. 4 of the third embodiment and FIG. 2 is that the transmission frame interval t31$j$ and the frame intervals t32$k$, t33$k$, t34$k$ and t35$k$ of the display scanning periods are indicated based on the end time points of the transmission period Hkj and the display scanning periods Lk0, Lk1, Lk2 and Lk3.

Since a video signal transmitted in the transmission period Hk needs to be used in the display scanning period Lk0, when the end time of the display scanning period Lk0 coincides with the end time of the transmission period Hk, the delay time from the drawing to the display can be minimized, and therefore the description is changed to that based on the end time point.

The video data of the first frame drawn in the drawing period G1 is transmitted in the transmission period H1, and is given to the display panel in the display scanning period L10. In order to minimize the delay time from the drawing to the display, the end of the drawing period G1 is made to approximately coincide with the start of the transmission period H1, and the end of the transmission period H1 is made to approximately coincide with the end of the display scanning period L10.

Like the case in FIG. 2, the transmission frame interval t311 between the first and second frames is calculated as a time obtained by adding a margin of about a prediction error to the predicted value of the drawing period t302 of the second frame, and the result of the calculation is transmitted from the video source device 11 to the display device 12 before the transmission period of the first frame.

The differences from FIG. 2 are that the display scanning period L10 is short and is thus arranged to coincide with the end timing of the transmission period H1 and that the transmission frame interval t311 is divided into halves corresponding to the display scanning periods t321 and t331 and the display scanning periods L11 and L20 are arranged for them, respectively.

In the case where the display device 12 is of a so-called hold type such as an LCD, even when the video interface transmits and receives a video signal of 60 Hz with an aim to improve the response speed, the refresh rate of the display panel 115 is doubled to quadrupled to be 120 to 240 Hz in some examples. The case where the display panel 115 of the high refresh rate like this is used is assumed.

Since the drawing period G3 of the third frame is long, the transmission frame interval t312 is also long, the display scanning periods L21, L22, L23 and L30 are uniformly arranged, and the display scanning frame intervals t322, t332, t342 and t352 are made equal to one another.

However, when the predicted value of the transmission frame interval t312 previously transmitted to the display device 12 is different from the actual value, it is preferable that the end timings of the display scanning period L30 and the transmission period H3 are made to coincide with each other by adjusting the last display scanning frame interval t352.

The actual value of the transmission frame interval is acquired by measuring the elapsed time from the start of the transmission period H2 at the start of the transmission period H3. Therefore, the actual value of the transmission frame interval can be obtained before the display scanning period L30 begins, and thus the display scanning frame interval t352 can be calculated.

When the drawing periods G4, G5 and G6 whose drawing time is shorter than the transmission time successively occur, the transmission of the fourth frame starts in the middle of the drawing period G5, but the frame drawn in the drawing period G4 is transmitted at least until the drawing period G5 ends.

In this case, the following four ways can be considered:
(1) continuing to transmit the frame drawn in the drawing period G4 even after the end of the drawing period G5;
(2) switching to a frame drawn in the drawing period G5 in the middle of the transmission period H4;
(3) switching to a frame obtained by combining the respective frames drawn in the drawing periods G4 and G5; and
(4) ending the transmission period H4 in the middle and shifting to the transmission period H5 for transmitting a frame drawn in the drawing period G5.

By transmitting which way out of the above (1) to (4) is taken to the display device 12, the control unit 116 of the display device 12 can provide a favorable video to viewers by controlling the brightness compensation unit 113, the response compensation unit 114, the display panel 115 and others.

The example in FIG. 4 illustrates the case where the above (1) is selected, and the drawing period G6 ends at the end of the transmission period H4. Therefore, the frame drawn in the drawing period G5 is not transmitted to the display device 12, and the frame drawn in the drawing period G6 is transmitted after the transmission period H4.

Since the drawing of frames that are not transmitted is wasted as described above, it is preferable that the total time of the drawing times t304, t305 and t306 is predicted and the drawing in the drawing period G5 is stopped if the total time is equal to or shorter than twice the frame transmission time, thereby reducing the power consumption.

As described above, when the frame interval of the display scanning period of the display panel 115 is short, the change in the frame transmission time can be promptly reflected on the display by setting the display scanning cycle so as to end immediately after the end of the transmission period.

In addition, the information about the shortest time and the longest time of the display scanning frame interval is transmitted from the control unit 116 in the display device 12 to the control unit 103 in the video source device 11, so that the video source device 11 can further reduce the delay time from the drawing to the display by bringing the transmission frame interval close to the display scanning frame interval.

As an inverse logic, when the shortest time of the display scanning frame interval is long, the design in which the transmission frame interval and the drawing time are not forcibly shortened with consideration for the power consumption is also preferable. The method for setting the display scanning frame interval and operations such as the brightness compensation and the brightness compensation are the same as those in FIG. 2, and the description of the operations and the effects thereof will be omitted.

Fourth Embodiment

<Configuration Example of Video Display System>

In the present fourth embodiment, the case where an external trigger enters during the drawing period and the re-drawing is performed will be described.

Figure 5:
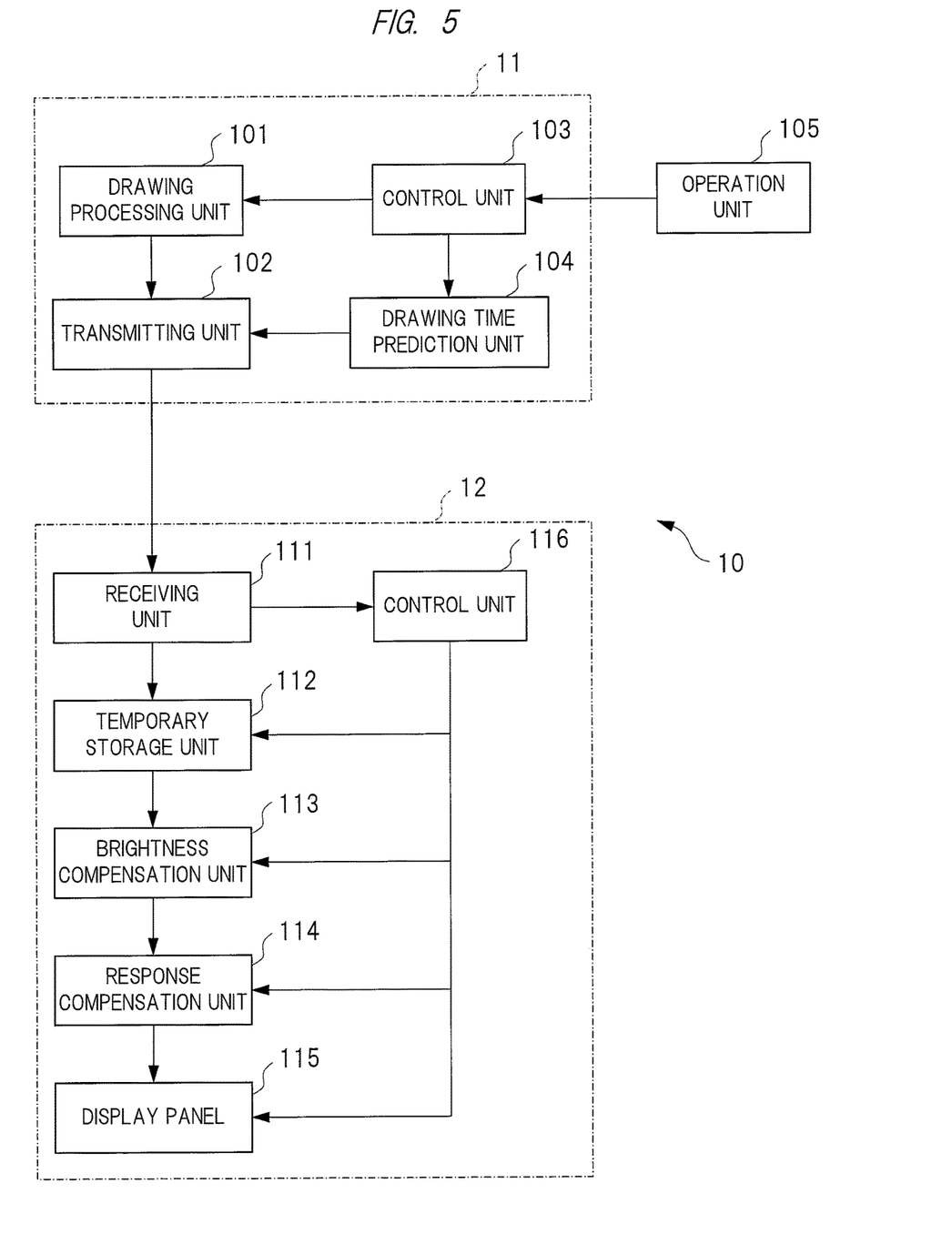
FIG. 5 is an explanatory diagram illustrating an example of a configuration in a video display system according to a fourth embodiment.

FIG. 5 is an explanatory diagram illustrating an example of a configuration in a video display system 10 according to the present fourth embodiment.

The video display system 10 shown in FIG. 5 is obtained by newly adding an operation unit 105 to the same configuration as that of the video display system 10 in FIG. 1 of the first embodiment. The operation unit 105 is, for example, an operation board used during a game play such as a game controller or the like.

The operation unit 105 is connected to the control unit 103. When an instruction to change the drawing conditions or the like is input from the operation unit 105 by the user during the drawing, the control unit 103 recognizes the instruction as an external trigger to stop the drawing at that time, and issues an instruction to start drawing of a new frame. Other examples of such an external trigger include a gesture input and various sensors.

<Operation Example of Video Display System>

FIG. 6 is an explanatory diagram illustrating an example of the timings of the drawing, the transmission and the display in the video display system 10 in FIG. 5. In FIG. 6, the timings of the drawing, the transmission and the display scanning are shown from the top to the bottom, respectively. In FIG. 6, the "DRAWING" represents the drawing period by the drawing processing unit 101. The "TRANSMISSION" represents the output period of the video signal and the frame interval information to be transmitted from the video source device 11 to the display device 12. The "DISPLAY" represents the display scanning period by the display panel 115.

Specifically, the Pi shown in the "DRAWING" in FIG. 6 indicates the drawing period of the i-th frame, and the Qj shown in the "TRANSMISSION" indicates the transmission period of the j-th frame. The Rk0 and the Rk1 shown in the "DISPLAY" in FIG. 6 indicate the display scanning periods of the k-th frame. Herein, each of i, j, and k is an integer.

In addition, the t40$i$ shown in the "TRANSMISSION" indicates the drawing time of the i-th frame, and the t41$j$ indicates the transmission frame interval between the j-th frame and the j+1-th frame (also referred to as a transmission frame cycle of the j-th frame). The t42$k$ and the t43$k$ shown in the "DISPLAY" respectively indicate the frame intervals of the display scanning periods of the Rk0 and the Rk1. In addition, the 801, 802 and 803 shown by arrows indicate the timings of the external triggers output from the operation unit 105. Note that the description of the same operations as those in FIG. 2 will be omitted.

In FIG. 6, when there is an external trigger 801 for redoing the drawing output from the operation unit 105 in the drawing period P2 of the second frame, the drawing processing unit 101 interrupts the drawing period P2 to shift to the drawing period P3 of the third frame.

Since the transmission frame interval t411 estimated from the drawing predicted time t402 of the second frame is transmitted to the display device 12 in the transmission period Q1 of the first frame or before it, an update is needed.

Thus, the drawing time prediction unit 104 predicts a new transmission frame interval t412 by predicting the drawing time t403 of the third frame and adding the period from the start of the drawing period P2 to the external trigger 801 to the predicted drawing time t403, and then transmits the transmission frame interval t412 to the display device 12.

The control unit 116 calculates the number of arranged display scanning periods from the lower limit and the upper limit of the frame interval of the display scanning period with respect to the updated transmission frame interval t412. The example in FIG. 6 shows the case where it is determined that it is difficult to add the R11 to the display scanning period R10 of the first frame. Whether a period is additionally arranged or not may be determined by the methods described in the embodiments above.

Since the brightness compensation and the brightness compensation are performed in the display scanning period R10 on the assumption of the same frame interval of the display scanning period as the initially planned frame interval t411, modification of the compensation amount is needed. However, since the boundary of changing the compensation amount in the frame is conspicuous, it is also possible to adjust the brightness compensation and brightness compensation in the next frame without performing the modification of the compensation amount.

The information about the video change by an external trigger may be provided from the video source device 11 to the display device 12 as metadata so that the adjustment of the brightness compensation and the brightness compensation is not applied when the change in drawing video by an external trigger is significant switching like a scene change and the adjustment can be applied only in the case of a partial movement and the like.

The external triggers 802 and 803 show examples where the timings to enter are sequentially delayed with respect to the drawing periods. When the external trigger 802 enters in the drawing period P4 of the fourth frame, the drawing period P5 is started, and the updated transmission frame interval t414 is transmitted to the display device 12. Along with this, the display scanning period R31 is added in addition to the display scanning period R30.

Although the driving of the display panel 115 in the display scanning period R30 assumes the same frame interval of the display scanning period as the initially planned transmission frame interval t413, the frame interval is shortened to the display scanning period frame interval t423. Consequently, modifications such as the brightness compensation and the brightness compensation become necessary, but the brightness compensation and the brightness compensation are adjusted in the display scanning period R31 without performing the modification in the display scanning period R30.

The external trigger 803 is input at the timing near the end of the drawing period P6 of the sixth frame, and the transmission period Q5 has also ended.

When it is determined that the transmission period Q6 can be arranged during the drawing time t407 of the seventh frame and the main part of the drawing in the drawing period P6 is completed, the frame of the drawing period P6 ended in the middle may be transmitted in the transmission period Q6 to be given to the display panel 115 in the display scanning period R60.

Since the frame of the transmission period Q6 is a frame whose drawing is interrupted, it is also possible to display the video of the frame by transmitting the information about the insufficient part from the video source device 11 to the display device 12 and inserting the insufficient video part to the video of the former frame. Of course, the video into which part of the former frame video is inserted may be generated in the video source device 11 and transmitted to the display device 12 in the transmission period Q6.

As described above, when an external trigger enters during the drawing period and the drawing is redone, the drawing time prediction unit 104 predicts the drawing time again to modify the interval information up to the frame to be transmitted next, and transmits the information to the display device 12. Consequently, the delay time from the drawing to the display can be shortened, and a high-quality video can be displayed.

In the foregoing, the examples where the transmission periods are relatively freely arranged have been described, and the technique described above can be applied also to a so-called frame thinning video transmission method. In the frame thinning video transmission method, a high and constant frame rate such as 240 Hz is used, the video transmission is performed in the earliest frame after the end of the drawing period, and the video transmission is not performed otherwise.

In this case, the same effects as those in the first to fourth embodiments described above can be obtained by writing a transmission frame interval up to a next video transmission frame in units of frames to a video transmission frame and transmitting the frame to the display device.

According to the above, as described thus far, the video source device 11 predicts the drawing time and transmits the transmission interval of each frame based on the prediction to the display device 12 in advance, so that the display device 12 can determine the number and the arrangement timing of the display scanning periods in accordance with the transmission interval of each frame and can optimally control video signal processing such as the brightness compensation and the brightness compensation and the driving conditions of the display panel. Consequently, the delay time from the drawing to the display can be shortened, and the high-quality video display can be achieved.

In the foregoing, the invention made by the inventor of the present invention has been concretely described based on the embodiments. However, it is needless to say that the present invention is not limited to the foregoing embodiments and various modifications and alterations can be made within the scope of the present invention.

Note that the present invention is not limited to the embodiments described above and includes various modification examples. For examples, the embodiments above have been described in detail so as to make the present invention easily understood, and the present invention is not always limited to the embodiment having all of the described constituent elements.

Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

REFERENCE SIGNS LIST 10 video display system
11 video source device
12 display device
101 drawing processing unit
102 transmitting unit
103 control unit
104 drawing time prediction unit
105 operation unit
111 receiving unit
112 temporary storage unit
113 brightness compensation unit
114 response compensation unit
115 display panel
116 control unit

The invention claimed is:
1. A video source device comprising:
a processor which predicts a time required for drawing based on drawing contents in a second frame next to a first frame and calculates frame interval information indicating an interval from when a video signal of the first frame is output to when a video signal of the second frame is output based on the predicted time; and
a transmitter which transmits the video signal and the frame interval information calculated by the processor to a display device for displaying a video,
wherein the processor obtains information about a shortest time and a longest time of a frame interval which the display device can display the video, and
wherein the processor calculates the frame interval information based on the predicted time, the shortest time, and the longest time of the frame interval obtained by the processor.
2. The video source device according to claim 1,
wherein the transmitter transmits the frame interval information after imparting it to the video signal of the first frame.
3. The video source device according to claim 1,
wherein the transmitter transmits the frame interval information in a period before the video signal of the first frame is output.
4. The video source device according to claim 1,
wherein the processor predicts the time again required for drawing when an external input enters and drawing is redone and modifies the frame interval information based on the again-predicted time,
the transmitter transmits the modified frame interval information to the display device.

* * * * *